United States Patent
Willmot

[19]

[11] Patent Number: 6,122,984
[45] Date of Patent: Sep. 26, 2000

[54] SHAFT PHASE CONTROL MECHANISM

[75] Inventor: Eric Paul Willmot, Melba, Australia

[73] Assignee: Aimbridge Pty Ltd., Melbourne, Australia

[21] Appl. No.: 09/125,838

[22] PCT Filed: Nov. 28, 1996

[86] PCT No.: PCT/AU96/00763

§ 371 Date: Aug. 21, 1998

§ 102(e) Date: Aug. 21, 1998

[87] PCT Pub. No.: WO97/30813

PCT Pub. Date: Aug. 28, 1997

[30] Foreign Application Priority Data

Feb. 23, 1996 [AU] Australia .................................. PN8244
Jun. 25, 1996 [AU] Australia .................................. PO0627

[51] Int. Cl.⁷ .................................................. F16H 35/00
[52] U.S. Cl. ................. 74/395; 74/665 GA; 74/665 GC; 475/6; 475/332
[58] Field of Search ............................... 74/395, 665 GA, 74/665 GC, 665 K; 475/6, 7, 9, 230, 248, 332, 340, 343

[56] References Cited

U.S. PATENT DOCUMENTS

| | | | |
|---|---|---|---|
| 2,163,035 | 6/1939 | Grupe | 74/395 X |
| 2,759,494 | 8/1956 | Honegger | 74/395 |
| 3,364,789 | 1/1968 | Whitfield | 475/7 |
| 5,174,716 | 12/1992 | Hora et al. | |
| 5,606,941 | 3/1997 | Trzmiel et al. | |

FOREIGN PATENT DOCUMENTS

| | | |
|---|---|---|
| 9467443 | 1/1995 | Australia . |
| 0396280 | 11/1990 | European Pat. Off. . |
| 531756 | 1/1941 | United Kingdom . |
| 569056 | 10/1945 | United Kingdom . |
| 627847 | 11/1949 | United Kingdom . |
| 2168435 | 6/1986 | United Kingdom . |
| 2175368 | 11/1986 | United Kingdom . |
| 2183783 | 6/1987 | United Kingdom . |
| 2221513 | 2/1990 | United Kingdom . |
| 8501490 | 4/1985 | WIPO . |
| 8703056 | 5/1987 | WIPO . |

*Primary Examiner*—Sherry L. Estremsky
*Attorney, Agent, or Firm*—Fulbright & Jaworski, LLP

[57] ABSTRACT

A phase control mechanism controls phase relationship between two shafts. The phase control mechanism may be used to control various mechanical devices such as the pitch of propellers of aircraft and boats, the pitch of power producing windmills, opening and closing lathe and drill chucks and controlling the eccentricity of some forms of continuously variable transmissions when the mechanisms are not only stationary but also in normal operational motion. The phase control mechanism includes first gears 3,4; 56,64 coupled to the output shafts which are to be phase controlled. A transfer gear 5; 16,17; 52,54 is provided for rotation or operation independent of the input and is coupled to the first gears 3,4; 56,64 to allow rotary motion to be transferred between the first gear members and a phase adjuster 10; 80 causes the first gears 3,4; 56,64 to advance or regress relative to one another to change the phase relationship between the outputs.

9 Claims, 3 Drawing Sheets

SHAFT PHASE CONTROL MECHANISM

FIELD OF THE INVENTION

This invention relates to a phase control mechanism for controlling a predetermined phase relationship of at least one output.

BACKGOUND AND SUMMARY OF THE INVENTION

Many situations exist in industry and transport where it is necessary to be able to alter the phase relationship between concentric rotating shafts, parallel shafts or other similar elements while they are in motion and under load.

Examples of this need, include the control of the pitch of propellers of aircraft and boats, particularly ships; controlling the pitch of power producing windmills; opening and closing lathe and drill chucks while they are in motion during production runs; controlling the eccentricity of some forms of continuously variable transmissions and determining the valve timing of cam shafts in internal combustion engines.

Operations of the type mentioned above is usually achieved by using electric devices or sliding mechanical mechanisms. These mechanisms all have difficulty with high levels of torque, and in general, with reliability.

A need therefore exists for a mechanical rotating mechanism which is able to alter the phase relationship between two or more concentric or parallel shafts while they are in motion and under load.

The invention may be said to reside in a phase control mechanism including:
  an input for supplying input rotary power;
  a plurality of outputs each for providing output rotary power;
  a plurality of first gear members each coupled to a corresponding output of the plurality of outputs;
  drive means for transmitting rotary power from the input to the outputs so that when the input is driven, power is supplied to the outputs for driving the outputs;
  a phase adjusting means for causing the first gear members to advance or regress relative to one another; and
  means for actuating the phase adjusting means to thereby cause the first gear members to advance or regress relative to one another to change the phase relationship between the outputs.

Thus, in order to change the phase relationship between the outputs the actuating means is moved to adjust the position of the adjusting means which in turn causes the first gear members to regress or advance relative to each other to change the phase relationship between the outputs. The phase between the outputs can therefore be adjusted to not only supply rotary power from the input to the outputs but also to alter the position of a device or article coupled on the outputs relative to one another. The phase relationship can be changed with the mechanism operating (that is supplying rotary power) or with the mechanism stationary. It is not necessary to stop the mechanism to change the phase relationship and therefore the phase relationship of the input and output can then be adjusted during operation as required.

In one embodiment of the invention the input is integral with a first of the output shafts and a second of the output shafts is mounted concentrically on the first output shaft, the drive means comprises:
  in respect of the first output, the integral coupling of that output to the input, and
  in respect of the second output comprises;
  (a) a fixed spur gear having a first set of teeth which mesh with teeth of the first gear member on the first output, the fixed spur gear having a second set of teeth which mesh with teeth on an idler gear rotatable relative to the outputs;
  a second spur gear which has a first set of teeth meshing with the idler gear and a second set of teeth meshing with the first gear member coupled to the second output; and
  wherein said second spur gear is mounted in a yoke pivotal relative to the outputs and wherein the second spur gear forms said phase adjusting means and the yoke forms said actuating means so that when the yoke is pivoted relative to the input and output, the second spur gear is driven around the first gear on the second output and the idler gear to cause the first gear on the second output to regress or advance relative to the first gear on the first output to alter the phase relationship between the input and output.

In a second embodiment of the invention, the input has a cage which supports at least one pinion gear, the pinion gear engaging a first bevel gear mounted on first output and a second bevel gear mounted on a second output;
  wherein said pinion gear and said first and second bevel gears form said drive means;
  said first gear member coupled to the first output being arranged on said cage and being coupled to the first output by the cage, the pinion gear and the first bevel gear, the first gear member on the cage engaging a first set of teeth of a fixed spur gear, the fixed spur gear having a second set of teeth for engaging an idler gear rotatable relative to the outputs, a second spur gear mounted in a yoke pivotable relative to the outputs, the second spur gear having a first set of teeth engaging said idler gear and a second set of teeth engaging said first gear member coupled to the second shaft; and
  wherein said second spur gear forms the phase adjusting means and wherein the yoke forms the actuating means so that upon pivoting movement of the yoke, the second spur gear is rotated around the idler gear and the first gear member on the second output to thereby cause the second gear member on the second output and the second bevel gear to advance or regress relative to the first gear member on the cage and the first bevel gear on the first output to thereby alter the phase relationship between the outputs.

In the second embodiment of the invention, the bevel gears and pinion gears, together with the intermediate shaft, take up a reaction caused by torque in the system rather than having the reaction applied against the moveable yoke.

Further, the bevel gears also distribute the torque equally between the output shafts. Furtherstill, these arrangements cause both shafts to be counter-rotated equally during the phase change operation.

In a third embodiment of the invention, the drive means comprises a cage coupled to the input which carries at least one planet shaft, the planet shaft carrying a first planet gear which meshes with the first gear fixed to the first output, the planet shaft also carrying a second planet gear which meshes with the first gear mounted on the second output;
  a first orbit gear arranged for rotation relative to the outputs and meshing with the first planet gear and a second orbit gear arranged for rotation relative to the outputs and engaging the second planet gear, one of the first or second orbit gears being fixed and the other of the first or second orbit gears being moveable relative to the said one of the orbit gears;

wherein the phase adjusting means comprises the moveable orbit gear which, upon rotation relative to the fixed orbit gear, causes the first gear fixed to the first output to advance or regress relative to the first gear fixed to the second output to in turn cause the phase relationship between the outputs to change; and wherein the actuating means comprises a handle on the moveable orbit gear for moving the moveable orbit gear relative to the fixed orbit gear.

In a fourth embodiment of the invention, a first of the output shafts includes a first cage and a second of the output shafts includes a concentric second cage:

the plurality of first gear members comprising a plurality of first bevel gears and a plurality of second bevel gears;

the first plurality of bevel gears being mounted on the first cage, and the second plurality of bevel gears being mounted on the second cage;

the input having a first bevel gear for engaging the first plurality of bevel gears on the first cage for driving the first cage to in turn rotate the first output shaft;

the input having a second bevel gear for engaging the second plurality of bevel gears on the second cage for rotating the second cage to in turn rotate the second output shaft;

the drive means comprising the first and second bevel gears of the input and the first and second plurality of bevel gears mounted on the first cage and the second cage.

In the fourth embodiment of the invention, the phase adjusting means comprises at least one control rod having a bevel gear thereon for engaging the first plurality of bevel gears or the second plurality of bevel gears so that upon rotation of the control rod, the bevel gear on the control rod is rotated to causes the-first plurality of bevel gears to advance or regress relative to the second plurality of bevel gears to thereby change the phase relationship between the first and second output shafts.

Preferably the means for actuating the phase adjusting means comprises a bevel gear mounted on the control rod and a motor for driving the bevel gear on the control rod to in turn rotate the control rod.

Preferably first and second control rods are included each carrying first and second bevel gears for engaging respectively the first plurality of bevel gears on the inner cage and the second plurality of bevel gears on the outer cage and preferably first and second motors and first and second bevel gear arrangements are arranged for rotating the first and second control rods to cause the first plurality of bevel gears on the inner cage to advance or regress relative to the second plurality of bevel gears on the outer cage to thereby change the phase relationship between the first and second output shafts.

The invention in a further aspect may be said to reside in a phase control mechanism, including:

an input for supplying input rotary power;

a plurality of outputs, each for providing output rotary power;

a plurality of first gear members each coupled to a corresponding output of the plurality of outputs;

drive means for transmitting rotary power from the inputs to the outputs so that when the input is driven, power is supplied to the outputs for driving the outputs;

a transfer gear for rotation or operation independently of the input, the transfer gear being meshingly coupled to the first gear members for allowing rotary motion to be transferred between the first gear members; and phase adjusting means for causing the first gear members to advance or regress relative to one another to change the phase relationship between the outputs.

In some embodiments of the invention, the transfer gear may form part of the drive means and be one of the gears in the drive means for transmitting rotary power from the input to the outputs. In other embodiments, the transfer gear may be separate from the drive means and not directly be involved in transmitting drive from the input to the outputs.

Preferably the transfer gear is meshingly coupled with the first gear members by being enmeshed with ancillary gears fixedly attached to the first gear members.

Preferably the transfer gear is mounted on the input.

Preferred embodiments of the invention will be described, by way of example, with reference to the accompanying drawings.

DETAILED DESCRIPTION OF THE INVENTION

Figure 1:
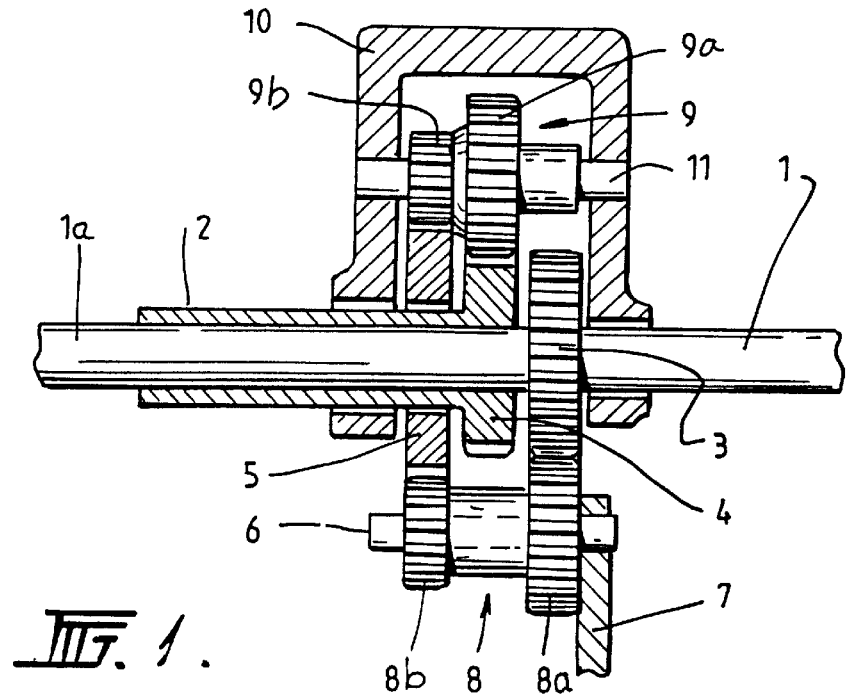
FIG. 1 is a view of a phase control mechanism according to a first embodiment of the invention.

With reference to FIG. 1, an input shaft 1 carries an integral first output shaft 1a which is provided with a concentric second output shaft 2 which are both supported in a suitable casing (such as casing 7 which is only partly shown in FIG. 1). The input shaft 1 and output shaft 2 can rotate freely relative to one another and thus the output shafts 1a and 2 rotate freely relative to one another.

The output shaft 1a is provided with a first gear 3 which may be integral with the output shaft 1a or mounted on the shaft 1a for rotation with the shaft 1a. The output shaft 2 is also provided with a first gear 4 which may be integral with the output shaft 2 or fixed to the output shaft 2 for rotation with the output shaft 2. The casing 7 supports a fixed lay shaft 6 upon which is rotatably mounted a fixed spur cluster 8. The fixed spur cluster 8 has a first set of teeth 8a which mesh with teeth on the gear 3 and a second set of teeth 8b which mesh with a transfer gear 5 which is mounted on the shafts 1a and 2 for rotation relative to the shafts 1a and 2.

A yoke 10 is rotatably mounted on the shafts 1a and 2 for pivoting movement about the shafts 1a and 2. The yoke 10 supports a lay shaft 11 upon which is mounted a spur cluster 9. The cluster 9 has a first set of teeth 9a which engage teeth on the gear 4 and a second set of teeth 9b which engage the transfer gear 5.

A predetermined ratio exists between the teeth 9a and 9b, the purpose of which will be described in more detail hereinafter.

Drive is transmitted from the input shaft 1 to rotate the shaft 1a by virtue of the integral nature of shafts 1 and 1a. Rotation of shaft 1a rotates the gear 3. Rotation of the gear 3 drives the spur cluster 8 which in turn rotates the transfer gear 5. The transfer gear 5 therefore rotates the spur cluster 9 which in turn rotates the gear 4 and the output shaft 2. Thus, drive is transmitted from the input shaft 1 to the output shaft 2. If the yoke 10 is held in one position and the input shaft 1 rotated, drive is therefore transmitted to the output shafts 1a and 2 as described above so that the output shaft 1a and output shaft 2 rotate in unison.

To alter the phase relationship between the output shaft 1a and output shaft 2, the yoke 10 is pivoted about the shafts 1a and 2. Thus, if the yoke 10 is now rotated through some arc, the spur gear 9 and lay shaft 11 are moved with the yoke 10 about the shafts 1a and 2 and transfer gear 5 and gear 4. Movement of the spur gear 9 against the transfer gear 5 will cause the gear 4 to advance or regress its rotation in relation to the gear 3. This will therefore alter the phase relationship between the gear 3 and the gear 4 and therefore between the output shaft 1a and the output shaft 2. This action occurs both with the shafts rotating or stationary. Thus, in order to change the phase relationship between the output shaft 1a and output shaft 2, it is not necessary to stop a machine to which the mechanism is connected and the phase relationship between the shafts can be adjusted or changed simply by pivoting the yoke 10 about the shafts 1 and 2. The yoke 10 may be manually pivoted or depending on the environment in which the mechanism is used, pivoted or fully rotated by a suitable actuating mechanism (not shown).

The transfer gear 5 forms a transfer gear which, as explained above, meshes with the gears 8 and 9 which in turn mesh with the first gears 3 and 4 attached to the output shafts 1a and 2. The transfer gear is mounted on the input but is able to rotate or otherwise operate independently of the input and allows rotary motion to be transferred between the gears 3 and 4.

In the embodiment of FIG. 1, the torque of the system will cause a reaction in the moveable yoke 10 which, in some environments, may make it difficult or uncomfortable to move the yoke 10.

Figure 2:
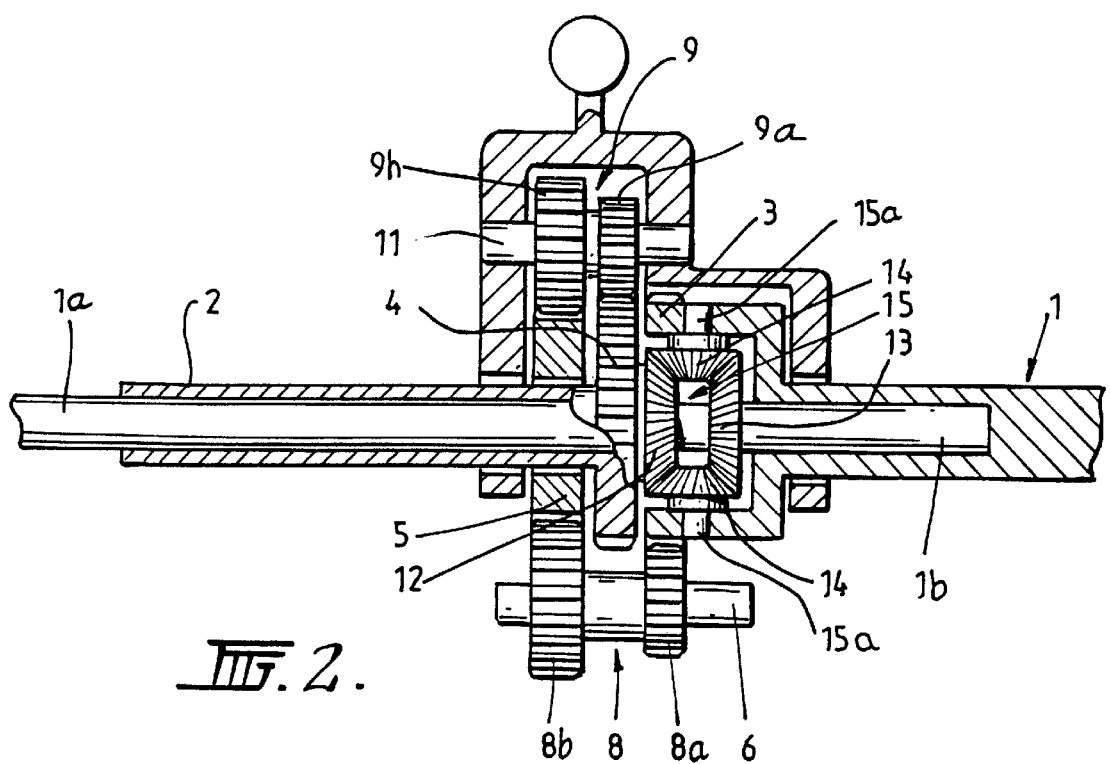
FIG. 2 is a view of a phase control mechanism according to a second embodiment of the invention.

FIG. 2 shows a second embodiment of the invention in which this problem is overcome. In FIG. 2, similar reference numerals indicate similar parts to those described with reference to FIG. 1.

In this embodiment of the invention the input shaft 1 carries a pinion cage 15. The pinion cage 15 carries the first gear 3 which meshes with the teeth 8a of fixed spur 8. The cage 15 carries a pair of shafts 15a upon which right angled pinion gears 14 are mounted.

Gear 4 which is coupled to second output shaft 2 carries a bevelled gear 12 which meshes with the pinion gears 15a. First output shaft 1a is arranged concentrically in the output shaft 2 and carries a pinion gear 13 which also meshes with the gears 15. The shaft 2 is hollow to accommodate the intermediate shaft 1a. The shaft 1a has an extension 1b which is accommodated rotatably within the input shaft 1 so the shafts 1, 1a and 2 can rotate relative to one another.

As in the earlier embodiments, the yoke 10 carries the moveable cluster 9 which has teeth 9a in intermeshing engagement with the transfer gear 5 which in turn meshes with teeth 8b of fixed cluster 8. The moveable cluster 9 also meshes with gear 4 as in the previous embodiment.

In the embodiment of FIG. 2, the yoke 10 is designed so that it sits over the cage 15 so that the yoke 10 can be pivoted on the shafts 1 and 2 relative to the shafts 1a and 2 and cage 15.

When the input shaft 1 is rotated, cage 15 is also rotated to cause the pinion gears 14 to rotate the gears 12 and 13 so that the output shaft 2 is rotated. The phase relationship between the output shaft 1a and output shaft 2 is adjusted by simply pivoting or fully rotating the yoke 10 to cause the spur gear 9 to rotate about gears 4 and 5 to cause the gear 4 and therefore the bevel gear 12 to advance or regress relative to the gear 3 carried by cage 15 and therefore the bevel gear 13. Thus, the phase relationship between the output shaft 1a and output shaft 2 can again be adjusted by rotating the yoke 10.

The amount of phase change upon a predetermined amount of pivoting of the yoke 10 is set by the gear ratio between the teeth 9a and 9b on the cluster 9. Thus, the ratio between the teeth 9a and 9b can be set to provide a large amount of phase shift between the shafts 1 and 2 upon a predetermined amount of pivoting of the yoke 10 or a small amount of phase shift with the same amount of rotation of the yoke 10.

The arrangement described with reference to FIG. 2 reduces the reaction back to the moveable yoke 10 thereby making the moveable yoke 10 more easy to move particularly if manual adjustment of the yoke 10 is desired.

The transfer gear 5 in this embodiment also forms a transfer gear which operates in a similar manner to the transfer gear 5 described with reference to FIG. 1.

Figure 3:
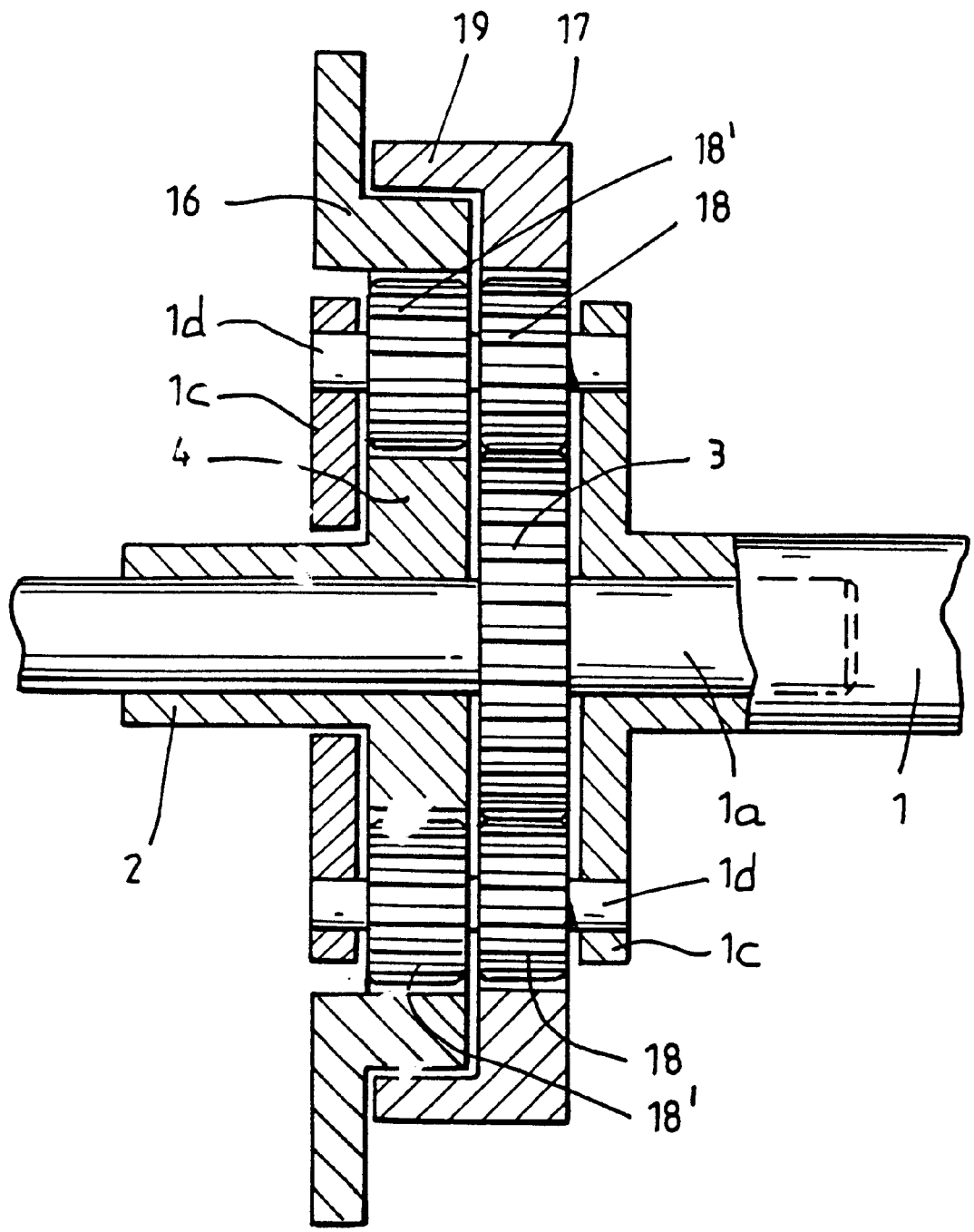
FIG. 3 is a view of a phase control mechanism according to a third embodiment of the invention.

A third embodiment of the invention is shown in FIG. 3. Once again, like reference numerals indicate like parts to those described with reference to FIGS. 1 and 2.

In this embodiment of the invention, the input shaft 1 carries a moveable circular cage 1c. Arranged in cage ic are planet shafts 1d upon which two sets of planet gears 18 and 18' are arranged. One set of planet gears 18 mesh with first gear 3 connected to first output shaft 1a and the other set 18' meshes with gear 4 coupled to second output shaft 2. A fixed orbit gear 16 meshes with the planet gears 18' and a moveable orbit gear 17 meshes with the planet gears 18. The moveable orbit gear 17 can have a handle 19 to facilitate its rotation relative to gear 16.

When the input shaft 1 is rotated, the cage 1c is also rotated to thereby rotate the planet gears 18 and 18'. This causes the gears 3 and 4 to rotate in unison. If the moveable orbit gear 17 is rotated, it will alter the phase relationship between the gears 3 and 4 and therefore between the output 1a and output 2.

In FIG. 3, the orbit gears 16 and 17 form transfer gears which perform the same function as the gears 5 described with reference to FIGS. 1 and 2. In this embodiment, as explained above, the gear 17 is moveable relative to the gear 16.

Figure 4:
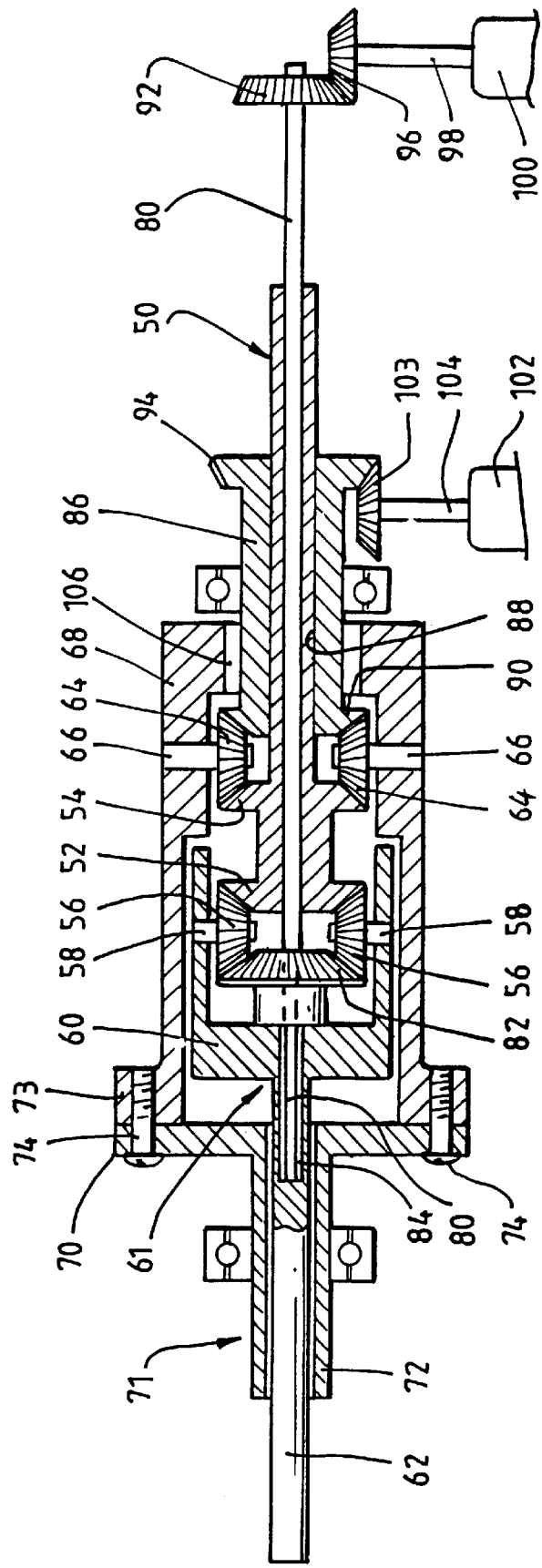
FIG. 4 is a view of a phase control mechanism according to a fourth embodiment of the invention.

FIG. 4 shows a further embodiment of the invention which is adapted for use in outboard motors for controlling the pitch of a propeller.

In this embodiment, the phase control mechanism has an input shaft 50 which carries a first bevel gear 52 and a second bevel gear 54 which are arranged in back to back relationship as seen in FIG. 4. The first bevel gear 52 meshes with a plurality of bevel gears 56 which are arranged on axles 58 coupled to an inner cage 60. The inner cage 60 forms part of an output shaft 61 and the output shaft 61 also includes an integral output shaft portion 62.

The second bevel gear 54 meshes with a plurality of bevel gears 64 which are mounted on axles 66 coupled to an outer cage 68. The outer cage 68 has a front cover plate 70 and forms part of a second concentric output shaft 71 which also includes an integral second output shaft portion 72. The cover plate 70 is bolted to a flange 72 of the cage 68 by bolts or screws 74.

As can be seen in FIG. 4, the first output shaft 62 is concentric with the shaft 72 and arranged within the shaft 72. The shaft 72 is obviously hollow to accommodate the shaft 62.

The input shaft 50 is hollow and a first control rod 80 is arranged within the input shaft 50 for rotation relative to shaft 50 and passes through the bevel gears 54 and 52. A bevel gear 82 is fixed to the shaft 80 and meshes with the bevel gears 56 which are coupled to the inner cage 60. The shaft 62 has a recess 84 for accommodating the end of the control rod 80. The control rod 80 is not coupled in the recess 84 so that the control rod 80 can rotate relative to the shaft 62.

A second control rod 86 is provided with a bore 88 and is arranged on the input shaft 50 and controller rod 80 as shown in FIG. 4 for location relative to the shaft 50 and rod 80. The second control rod 86 has a bevel gear 90 which meshes with the bevel gears 64 coupled to the outer cage 68.

The control rod 80 is provided with a bevel gear 92 and the control rod 86 is provided with a bevel gear 94. The bevel gear 92 engages with a bevel gear 96 which is coupled to a drive rod 98 which in turn can be driven by a motor 100. The bevel gear 94 engages with a bevel gear 102 which is mounted on a drive rod 104 which in turn can be rotated by a motor 102.

In order to provide output drive to the shafts 62 and 72, the input shaft 50 is driven by a power supply (not shown) such as the outboard motor (not shown) with which the phase control mechanism shown in FIG. 4 can be used. Rotation of the input shaft 50 will rotate the bevel gears 52 and 54 which in turn will drive the bevel gears 56 and 66 so that the inner cage 60 and outer cage 68 are rotated about the longitudinal axis of the input shaft 50 to in turn rotate the output shafts 72 and 62 to provide output power.

In order to adjust the phase of the shaft 62 with respect to the shaft 72 to, for example, alter the pitch of a propeller driven by the outboard motor, (not shown) either the control rod 80 or control rod 86 is rotated or, indeed, both control rods 80 and 86 can be rotated. Rotation of the control rod 80 will rotate the bevel gear 82 which will cause the bevel gears 56 to advance or regress relative to the bevel gears 64 to in turn cause the inner cage 60 to rotate relative to the outer cage 68 to thereby change the phase relationship between the shafts 72 and 62. Similarly, if the second control rod 86 is rotated, the bevel gear 90 will be rotated to cause the bevel gears 64 to advance or regress relative to the bevel gears 56 to also cause the cage 68 to rotate relative to the cage 60 to thereby change the phase relationship between the shafts 62 and 72. Thus, the phase relationship between the shafts 62 and 72 can be altered by rotation of the control rod 80, or rotation of the control rod 86 or rotation of both control rods 86 and 80.

The control rods 80 and 86 are preferably controlled by motors 100 and 102 which are preferably electric motors which can be actuated by an electric supply (not shown). Actuation of the motors 100 and 102 will rotate drive shafts 98 and 104 to in turn rotate bevel gears 96 and 102 so that the bevel gears 92 and 94 are driven to rotate the control rod 80 or control rod 86 about their respective longitudinal axes.

Thus, in the case of an outboard motor, the motors 102 and 100 can be actuated to selectively shift the phase of the rods 62 and 72 relative to one another to place a propeller (not shown) at a predetermined pitch suitable for take-off so that the outboard motor need not be highly revved in order to propel the boat from a stationary position. As the boat picks up speed, the pitch of the propeller can be altered accordingly by adjustment of the control rods 80 or 86 under the influence of motors 100 and 102 to set the pitch of the propellers for continued propulsion as the boat continues to move.

In FIG. 4, the bevel gears 52 and 54, which are effectively integral with one another being provided on the input shaft 50, form transfer gears which operate in the same manner as the gears 5 described with reference to FIGS. 1 and 2.

The phase control mechanism of FIG. 4 may be positioned beneath water level so it is water cooled and appropriate seals may be included to ensure that the mechanism is water-tight. A bearing 106 may be disposed between the control rod 86 and the cage 68 for supporting relative rotation of the cage 68 with respect to the control rod 86.

In the preferred embodiments of the invention described above, the phase relationship between two output shafts is adjusted. It would also be possible to alter the phase relationship between more than two output shafts by adding additional output shafts concentric with the output shafts 1$a$ and 2 and duplicating the mechanism described above so that there would be a series of yokes 10 or moveable orbit gears 17 which can be adjusted to alter the phase relationship between three or more shafts.

Since modifications within the spirit and scope of the invention may readily be effected by persons skilled within the art, it is to be understood that this invention is not limited to the particular embodiment described by way of example hereinabove.

It is claimed:

1. A phase control mechanism comprising:

an input for supplying input rotary power;

a plurality of outputs each for providing output rotary power;

a plurality of first gear members each coupled to a corresponding output of the plurality of outputs;

drive means for transmitting rotary power from the input to the outputs so that when the input is driven, power is supplied to the outputs for driving the outputs;

a phase adjusting means for causing the first gear members to advance or regress relative to one another; and means for actuating the phase adjusting means to thereby cause the first gear members to advance or regress relative to one another to change the phase relationship between the outputs;

wherein the input is integral with a first of the output shafts and a second of the output shafts is mounted concentrically on the first output shaft, the drive means comprises:

in respect of the first output, the integral coupling of that output to the input, and in respect of the second output comprises;

a fixed spur gear having a first set of teeth which mesh with teeth of one of the first gear members and having a second set of teeth which mesh with teeth on an idler gear rotatable relative to the outputs;

a second spur gear which has a first set of teeth meshing with the idler gear and a second set of teeth meshing with the first gear member coupled to the second output; and wherein said second spur gear is mounted in a yoke pivotal relative to the outputs and wherein the second spur gear forms said phase adjusting means and the yoke forms said actuating means so that when the yoke is pivoted relative to the input and output, the second spur gear is driven around the first gear on the second output and the idler gear to cause the first gear on the second output to regress or advance relative to the first gear on the first output to alter the phase relationship between the input and output.

2. A phase control mechanism comprising:

an input for supplying input rotary power;

a plurality of outputs each for providing output rotary power;

a plurality of first gear members each coupled to a corresponding output of the plurality of outputs;

drive means for transmitting rotary power from the input to the outputs so that when the input is driven, power is supplied to the outputs for driving the outputs;

a phase adjusting means for causing the first gear members to advance or regress relative to one another; and means for actuating the phase adjusting means to thereby cause the first gear members to advance or regress relative to one another to change the phase relationship between the outputs;

wherein the input has a cage which supports at least one pinion gear, the pinion gear engaging a first bevel gear mounted on first output and a second bevel gear mounted on a second output;

wherein said pinion gear and said first and second bevel gears form said drive means;

said first gear member coupled to the first output being arranged on said cage and being coupled to the first output by the cage, the pinion gear and the first bevel gear, the first gear member on the cage engaging a first set of teeth of a fixed spur gear, the fixed spur gear having a second set of teeth for engaging an idler gear rotatable relative to the outputs, a second spur gear mounted in a yoke pivotable relative to the outputs, the second spur gear having a first set of teeth engaging said idler gear and a second set of teeth engaging said first gear member coupled to the second output; and wherein said second spur gear forms the phase adjusting means and wherein the yoke forms the actuating means so that upon pivoting movement of the yoke, the second spur gear is rotated around the idler gear and the first gear member on the second output to thereby cause the second gear member on the second output and the second bevel gear to advance or regress relative to the first gear member on the cage and the first bevel gear on the first output to thereby alter the phase relationship between the outputs.

3. A phase control mechanism comprising:

an input for supplying input rotary power;

a plurality of outputs each for providing output rotary power;

a plurality of first gear members each coupled to a corresponding output of the plurality of outputs;

drive means for transmitting rotary power from the input to the outputs so that when the input is driven, power is supplied to the outputs for driving the outputs;

a phase adjusting means for causing the first gear members to advance or regress relative to one another; and means for actuating the phase adjusting means to thereby cause the first gear members to advance or regress relative to one another to change the phase relationship between the outputs, wherein a first of the output shafts includes a first cage and a second of the output shafts includes a concentric second cage;

the plurality of first gear members comprising a plurality of first bevel gears and a plurality of second bevel gears;

the first plurality of bevel gears being mounted on the first cage, and the second plurality of bevel gears being mounted on the second cage;

the input having a first bevel gear for engaging the first plurality of bevel gears on the first cage for driving the first cage to in turn rotate the first output shaft;

the input having a second bevel gear for engaging the second plurality of bevel gears on the second cage for rotating the second cage to in turn rotate the second output shaft;

the drive means comprising the first and second bevel gears of the input and the first and second plurality of bevel gears mounted on the first cage and the second cage.

4. The phase control mechanism of claim 3 wherein first and second control rods are included each carrying first and second bevel gears for engaging respectively the first plurality of bevel gears on the inner cage and the second plurality of bevel gears on the outer cage and first and second motors and first and second bevel gear arrangements are arranged for rotating the first and second control rods to cause the first plurality of bevel gears on the inner cage to advance or regress relative to the second plurality of bevel gears on the outer cage to thereby change the phase relationship between the first and second output shafts.

5. The phase control mechanism of claim 3 wherein the phase adjusting means comprises at least one control rod having a bevel gear thereon for engaging the first plurality of bevel gears or the second plurality of bevel gears so that upon rotation of the control rod, the bevel gear on the control rod is rotated to causes the first plurality of bevel gears to advance or regress relative to the second plurality of bevel gears to thereby change the phase relationship between the first and second output shafts.

6. The phase control mechanism of claim 5 wherein the means for actuating the phase adjusting means comprises a bevel gear mounted on the control rod and a motor for driving the bevel gear on the control rod to in turn rotate the control rod.

7. A phase control mechanism comprising:

an input for supplying input rotary power;

a plurality of outputs, each for providing output rotary power;

a first gear coupled to one of the outputs of the plurality of outputs, the input being connected to said one of the outputs so that when the input rotates, the said one output and the first gear rotate with the input;

a second gear coupled to another of the outputs;

at least one first spur cluster having a first spur gear for driving by the first gear, and a second spur gear fixed for rotation with the first spur gear;

at least one second spur cluster having a third spur gear for driving the second gear, and a fourth spur gear fixed for rotation with the third spur gear;

a gear mechanism meshing with the second spur gear and the fourth spur gear for transmitting drive from the first gear to the second gear via the first and second spur clusters; and phase adjusting means for causing relative rotation between the first and second spur clusters to in turn cause the first gear to advance or regress relative to the second gear to change the phase relationship between the outputs.

8. A phase control mechanism, comprising:

an input for supplying input rotary power;

a plurality of outputs, each for providing output rotary power;

a plurality of first gear members each coupled to a corresponding output of the plurality of outputs;

drive means for transmitting rotary power from the inputs to the outputs so that when the input is driven, power is supplied to the outputs for driving the outputs;

a transfer gear for rotation or operation independently of the input, the transfer gear being meshingly coupled to the first gear members for allowing rotary motion to be transferred between the first gear members; and phase adjusting means for causing the first gear members to advance or regress relative to one another to change the phase relationship between the outputs wherein the transfer gear is meshingly coupled with the first gear members by being enmeshed with ancillary gears fixedly attached to the first gear members.

9. The phase control mechanism of claim 8, wherein the transfer gear is mounted on the input.

* * * * *